(No Model.) 4 Sheets—Sheet 3.
W. BUCHANAN.
BALL AND SOCKET JOINT.
No. 406,561. Patented July 9, 1889.
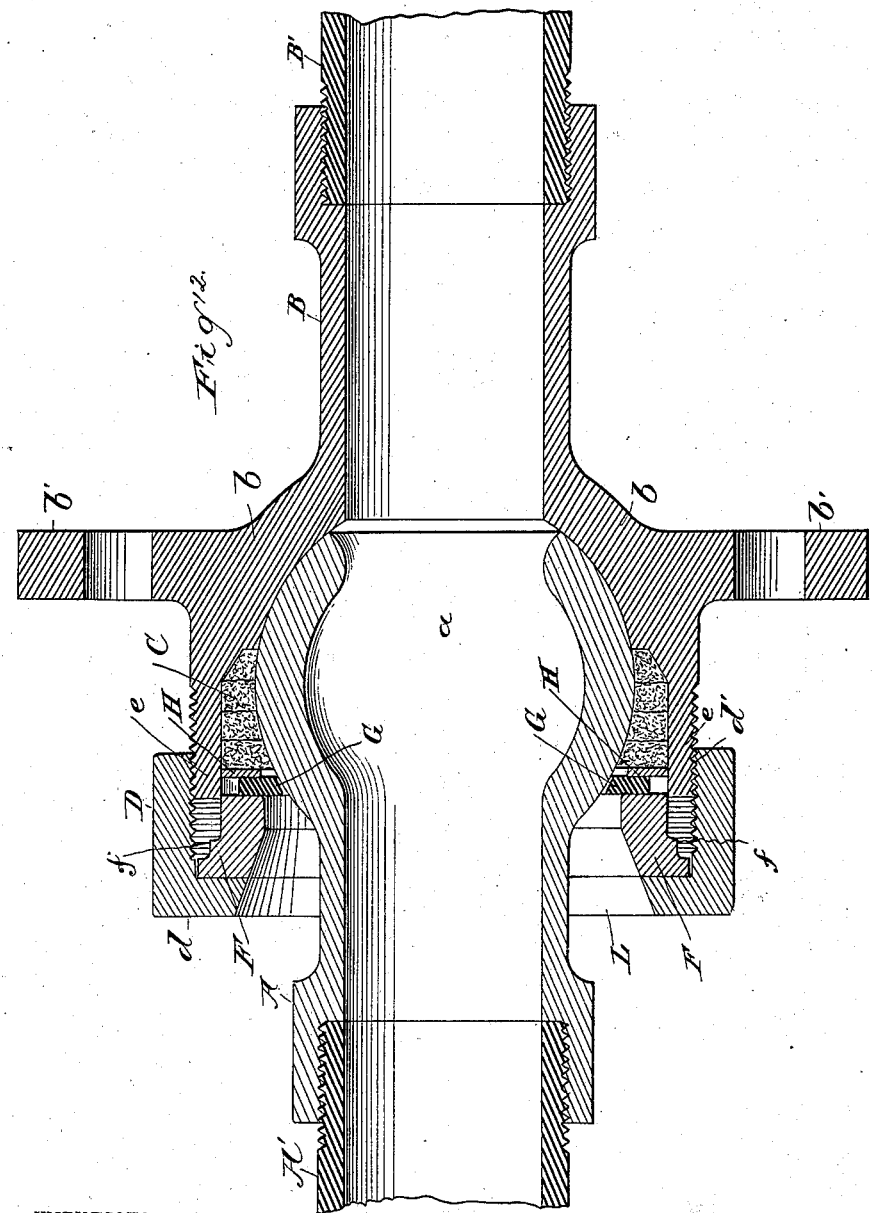
WITNESSES:
INVENTOR
BY
ATTORNEY (No Model.) 4 Sheets—Sheet 4.
W. BUCHANAN.
BALL AND SOCKET JOINT.
No. 406,561. Patented July 9, 1889.
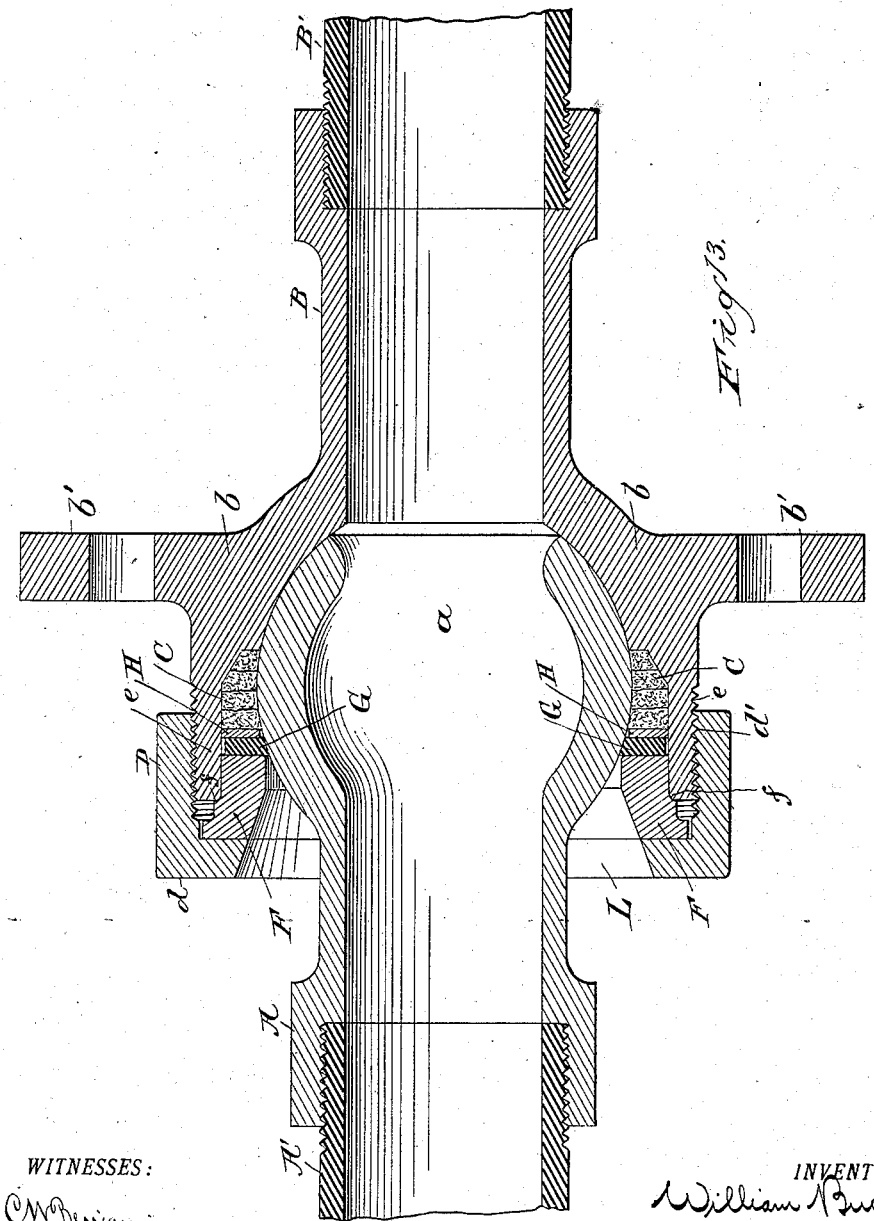
WITNESSES:
INVENTOR
William Buchanan
BY Joseph L. Levy
his ATTORNEY

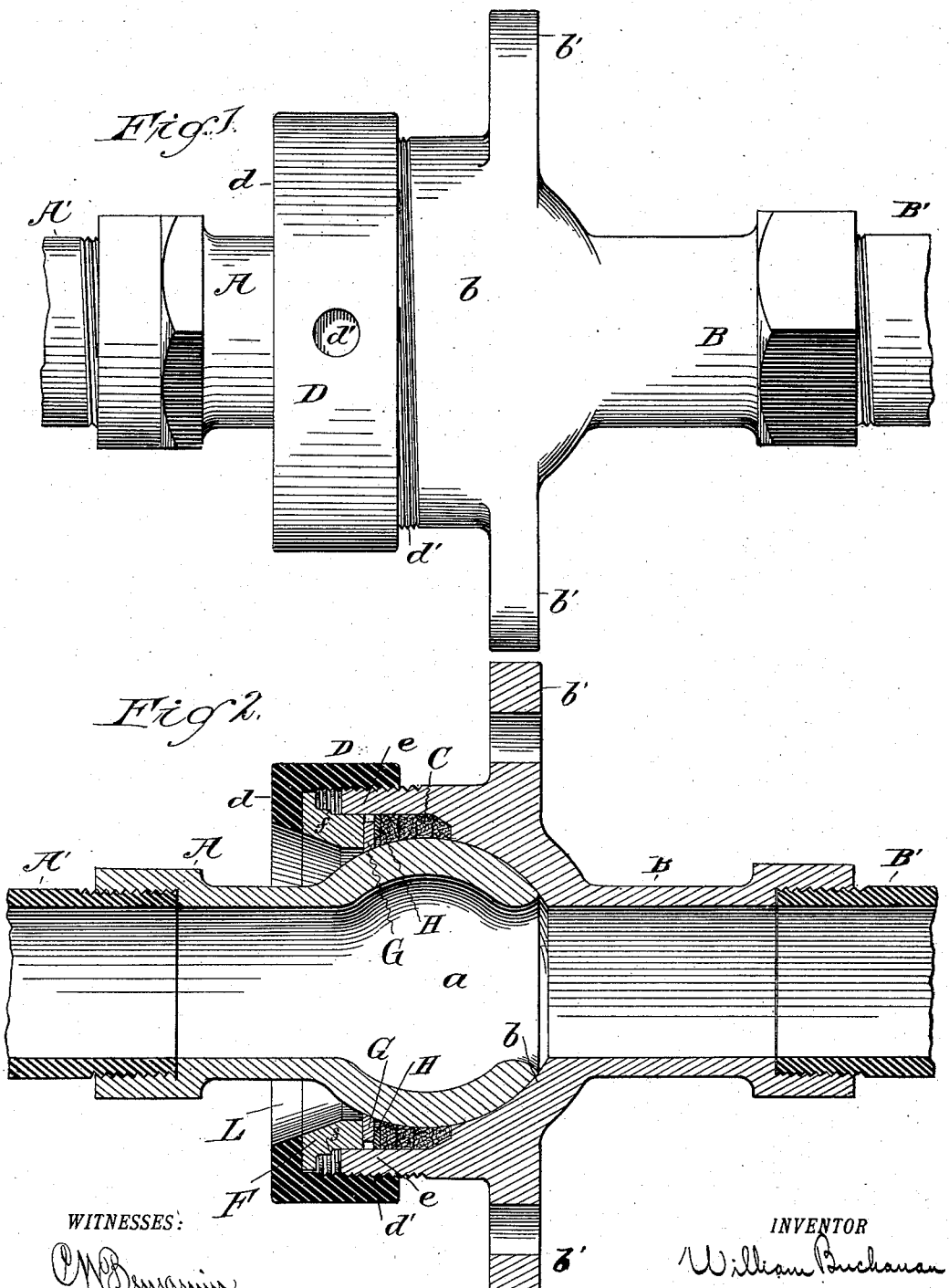

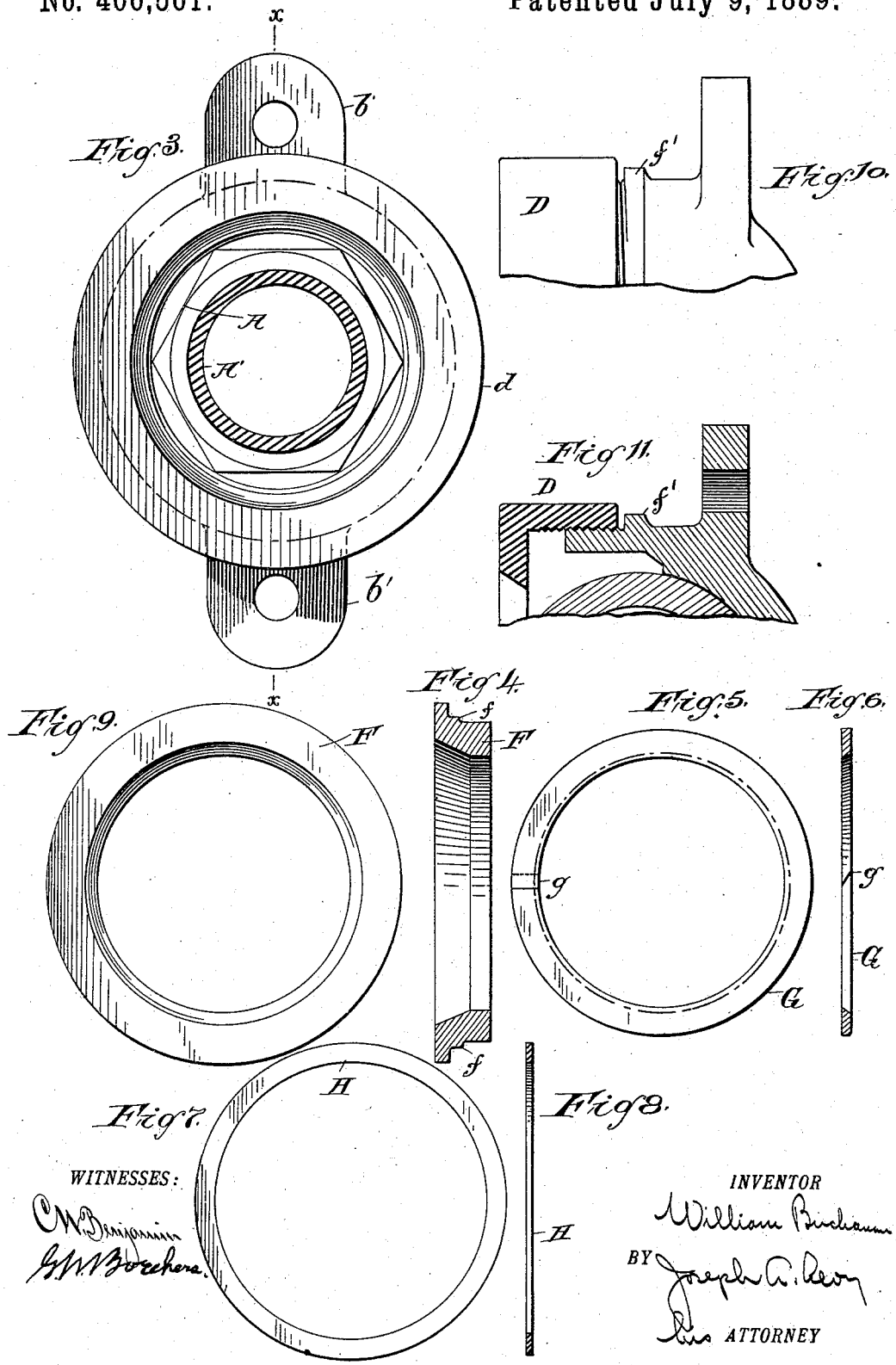

UNITED STATES PATENT OFFICE.

WILLIAM BUCHANAN, OF NEW YORK, N. Y.

BALL-AND-SOCKET JOINT.

SPECIFICATION forming part of Letters Patent No. 406,561, dated July 9, 1889.

Application filed January 23, 1889. Serial No. 297,238. (No model.)

*To all whom it may concern:*

Be it known that I, WILLIAM BUCHANAN, a citizen of the United States, and a resident of New York, in the county of New York and State of New York, have invented certain new and useful Improvements in Ball-and-Socket Joints; and I do hereby declare that the following, when taken in connection with the accompanying drawings, will enable others skilled in the art to practice my invention.

My invention relates to the construction of ball-and-socket joints; and it consists in packing the same so that freedom of action of the parts in contact is provided for, and at the same time enabling the packing to be done with certainty and expedition and a comparatively small expenditure of time and labor, besides the cost, rendering the device available on account of its cheapness and compactness.

My invention further consists in so constructing and arranging the parts in relation to each other that a ball or spherical body may be held within its corresponding socket, if not wholly, almost entirely, by means of the friction of the contained packing, at the same time permitting universal play of the parts, and whereby I am enabled to utilize the packing used in the device as the means for retaining and confining the ball within its socket, and thus lessening the friction of the parts in contact, in contradistinction to the method of retaining and confining the ball within its socket by means of a gland or follower brought into frictional contact with the said ball or spherical portion of the joint.

My invention is especially adapted for use in the connection of pipes between railroad-cars or in other like situations.

Ordinary stuffing-boxes used around cylindrical piston-rods, valve-rods, or the like have the capacity of being tightened from time to time, so that the pressure on the packing in the box can be gradually increased or maintained, and this is accomplished by moving slightly inward at each operation of compression the gland or follower of the stuffing-box, and in such boxes this operation can be repeated a number of times, and the chamber within which the packing lies becomes smaller each time the gland or follower is forced into the stuffing-box proper. This is a very useful and desirable feature for a packed joint, and this feature, so far as I am aware, has never been successfully produced by any of the earlier ball-and-socket connections in which packing has been employed; but, on the other hand, the interior of the gland or follower is shaped to conform to the exterior of the ball, and when packing is first put in the packing-recess the glands or followers have to be screwed home to a predetermined point, and after this further tightening becomes difficult, if not impossible, and when a leak occurs the glands or followers have to be removed and the joint made tight by the insertion of additional packing, which is a troublesome operation, requiring skill and experience in its performance, this disadvantage being entirely obviated by my construction.

In devices prior to mine, after the glands or followers are screwed up tight, the packing may work out of the space between the gland or follower and the surface of the ball, and this leads to serious inconvenience and leaking and would deprive the packing of pressure from the gland or follower at the point where such pressure is most necessary, and if the glands were not screwed home the device would be inoperative.

Reference will now be had to the accompanying drawings, forming part of this specification, in which—

Figure 1 is a side elevation of a joint constructed according to my invention. Fig. 2 is a longitudinal section, and Fig. 3 an end view, thereof. Figs. 4, 5, 6, 7, 8, and 9 are detailed views of various parts of the device. Figs. 10 and 11 illustrate a detached portion of the device, showing an alternative feature. Figs. 12 and 13 are respectively longitudinal sections, showing the relation of parts at the beginning and ending of the tightening-up operation.

Similar letters refer to similar parts throughout the several views.

My invention specially consists in a ball-joint and packing therefor, which, like a stuffing-box surrounding a cylindrical rod, can be within certain limits screwed up when the packing leaks, thus compressing the packing and at each successive operation making the space which contains the packing smaller; and this I am enabled to do even after the gland has been entered into the packing-space without having the packing, which is compressed during the screwing up of the follower, insert itself between the inner surface of the gland and the outer surface of the ball, which prevents further tightening up and causes a leaky joint. Besides, by my construction the ball is held within the socket almost entirely by the packing, and not by frictional contact of the gland against the ball.

A and B show the two parts of my ball-joint with the line-pipes A and B connected thereto. The section A is provided with a ball, as shown at $a$, and the section B is provided with a socket to receive the ball, as shown at $b$. The packing which is to make the joint tight is shown at $c$.

D is the follower, provided with a flange $d$ and a screw-thread, as shown at $d'$, which enables the follower D to be screwed upon the stuffing-box portion $e$ of the socket-section B.

F is a gland, which is arranged to enter the stuffing-box $e$ and to compress the packing therein, the gland being forced into the stuffing-box by the follower D, which, when it is turned, is forced inward by the screw-thread $d'$. If the gland F is arranged to press directly upon the packing, the operation is not satisfactory, as the packing is forced out between it and the ball $a$, and the gland cannot be made to fit the stuffing-box as does the gland of an ordinary stuffing-box, for the reason that one of the walls of the stuffing-box of a ball-joint is necessarily hemispherical, or partly so.

To keep the packing from passing the gland F, I adopt the following arrangement of parts: A ring G is constructed so that it fits within the stuffing-box and closely surrounds the external portion of the ball $a$. This ring is shown in detail at Figs. 5 and 6. This ring is split, as shown at Figs. 5 and 6, at $g$, so that as the follower is turned and the gland F is forced into the stuffing-box the split ring can expand and move over the hemispherical surface of the ball $a$, and to allow for this expansion of the ring the external diameter of the said ring is so proportioned that it can be forced down over the hemispherical ball as far as the gland and follower can proceed without becoming jammed between the exterior surface of the ball $a$ and the interior surface of the stuffing-box $e$. If this ring G alone presses upon the packing, the said packing is liable to pass up between the exterior of the ring G and the interior of the stuffing-box $e$, and this might prevent the further expansion of the ring. To avoid this, I place against the split ring G another ring H, which, though not essential, is highly useful. This ring is shown in detail in Figs. 7 and 8. Its external diameter is made to correspond with the internal diameter of the stuffing-box portion $e$, and its interior diameter is made less than the exterior diameter of the portion of the ball $a$, which it is to surround, when the gland is screwed in as far as it can go. With the ball placed in the position shown in Fig. 2, it will be seen that the section A of the ball-and-socket joint can be moved about freely, the space L enabling the two parts of the connection to be moved in relation to one another. If it becomes desirable to tighten up the packing, as it will be when the device is in use, the follower D is screwed with a suitable wrench upon the part $e$ of the socket-section B by means of the screw $d'$. When this is done, the gland F is forced into the stuffing-box a corresponding distance, and as it enters the stuffing-box and presses the packing the split ring G slides over the spherical surface of the ball $a$, and in doing so it expands, a portion of its interior surface always remaining in contact with the exterior surface of the ball $a$. As this ring is moved over the ball, it also forces the ring H inward in the stuffing-box, and the movement of these parts inward compresses the packing and tightens the joint by forcing the packing against the surfaces which it is desired to pack, and in this operation the packing cannot escape in any direction, but is held closely within the space allotted to it, although one of the walls is hemispherical, or partly so. If the rings G and H were not properly proportioned and the follower D screwed up too far, the ring G would be so expanded in passing over the ball $a$ that it would jam between the exterior surface of the ball $a$ and the interior surface of stuffing-box, and likewise the ring H might also become jammed. To avoid any liability of trouble from this cause I provide a stop device, which may be as follows: The gland F may be provided with a shoulder $f$, as shown in Fig. 2, and this shoulder will come in contact with the upper portion of the parts $e$ before the ring G can be expanded to a sufficient degree to become jammed, and when it is found that the parts cannot be screwed up any farther and the joint is still leaky it is evidence of the fact that new packing should be substituted for that in the box, as that has had all the compression applied to it which the device is capable of.

Instead of having the shoulder arranged on the gland as shown in Fig. 2, the stop device may be arranged as shown at F, Figs. 10 and 11, where the shoulder is located upon the part $e$ and arrests the inward motion of the follower D, thus preventing the said follower from moving so far inward as to cause the gland (not shown in Figs. 10 and 11) to force the ring into such a position that it will jam the joint and prevent it moving freely.

In constructing the parts I have made the interior diameter of the ring H of such a size that it will not under any circumstances become jammed between the ball $a$ and the interior surface of the part $e$, but will be free up to the point where the gland is stopped. By properly arranging the stop-shoulder $f$ or $f'$ (either is shown in Fig. 2 or Figs. 10 and 11) I am enabled always to avoid the possibility of any jamming of either the ring G or the ring H; but my invention would not be avoided if such stop devices were not used.

I have shown the follower D as adapted for a pin-wrench, as shown at $d'$; but it is evident that it may be constructed or provided with projecting handles, or as an octagon or hexagon, and serve exactly the same purpose. In fact, any form of device whereby the follower may be screwed and move the gland up will answer. The gland and follower might be made in one piece.

I have also shown the part B as provided with lugs $b'$, thus adapting the section B to be secured to any fixed object; but it is evident that some other form of securing means may be adopted for either section, or may be dispensed with, or may be arranged in any other desired manner.

Fig. 12 shows the relation of the parts when the packing is first inserted, and Fig. 13 shows the same parts when the gland has been screwed home and the packing-space reduced to its minimum. Thus I provide, according to my invention, a packing for a ball-and-socket joint which has the good qualities of an ordinary stuffing-box and packing surrounding a cylindrical rod, while at the same time it is adapted for a ball-and-socket joint. To accomplish this result I do not make the interior of the gland or follower, or both, to conform to the exterior surface of the ball, but I so form and shape it that it does not touch or come in contact with the ball at all, even when screwed inward as far as it can go, and in this way I am enabled, when the joint leaks, to tighten up the packing, as in an ordinary stuffing-box, until such successive tightening operations have been continued to the limit of movement allowed by the construction of the parts, and the amount of such inward movement of the gland or follower, or both, may be proportioned to suit the constructer of the device.

In the drawings herewith I have shown at Fig. 2 a capacity of movement of the gland of about a quarter of an inch; but this can be varied and made more or less on the structures of the same size that are shown in the drawings, and on larger structures this movement may be much greater.

It is also apparent from the construction of my device that the disadvantages resulting from the ball being held within its socket by its frictional contact with the gland are entirely obviated, and that the packing, in conjunction with the split ring, act together as the sole direct means of holding the ball within the socket, thus giving a large packing-surface and insuring a tight joint. A greater play can be given to the ball by a proper proportioning of the parts.

I have spoken in the claims attached hereto of the "gland" or "follower." By this expression I mean to imply that part or parts of the device which serve the functions of the parts which I have selected for illustration, and which are lettered D and F, and likewise where the terms "gland" and "follower" are used it is to be understood that these terms may refer to a structure made in one piece.

I have therefore produced a stuffing-box packing device for a ball-and-socket joint which possesses the benefits inherent in the ordinary stuffing-box, and I therefore in no wise limit myself to the particular shape of the parts, as it is evident that ball-and-socket joints of various shapes can be packed in this way, the gist of my invention residing in the method of keeping the packing from passing the gland when the said gland is forced into the stuffing-box to compress the packing therein, and holding the ball within the socket by means other than the gland itself.

What I claim, and desire to secure by Letters Patent, is—

1. In a ball-and-socket joint, the combination of a socket having a packing-space formed within its walls, a soft packing interposed between the ball and socket, a ball within said socket, a gland or follower, said gland or follower being so constructed as to avoid frictional contact with the ball, and an expansible ring interposed between the gland and packing, substantially as and for the purposes set forth.

2. In a ball-and-socket joint, the combination of a socket having a packing-space formed in its walls, a soft packing, a ball within the socket, a gland or follower so arranged as to have no frictional contact with the said ball, an expansible ring between the gland or follower and the packing, and a movable ring between the packing and said expansible ring, substantially as set forth.

3. In a ball-and-socket joint, the combination of a socket having a packing-space formed in its walls, a soft packing interposed between the ball and socket, a ball within said socket, a gland or follower, means for restricting the inward movement of said gland, and an expansible ring interposed between the gland and packing, substantially as and for the purposes set forth.

4. In a ball-and-socket joint, the combination of a socket having a packing-space formed in its walls, a soft packing, a ball within the socket, a gland or follower, a shoulder formed on said gland, an expansible ring between the said gland and packing, and a movable ring between the packing and said expansible ring, substantially as set forth.

5. The combination, in a ball-and-socket joint, of a ball and socket, said ball being within said socket, a gland or follower arranged as described, split ring G, and movable ring H, and soft packing beneath said movable ring, these parts being arranged for joint operation substantially as hereinbefore set forth.

6. The combination, in a ball-and-socket joint, of a ball *a*, socket *b*, said ball being within said socket, packing *c*, a gland or follower arranged as described, split ring G between the gland and packing, and a movable ring H between the packing and said split ring, these parts being arranged for joint operation substantially as hereinbefore set forth.

Signed at the city, county, and State of New York this 21st day of January, 1889.

WILLIAM BUCHANAN.

Witnesses:
ARTHUR G. LEONARD,
SAML. F. TAYLOR.